United States Patent
Chen et al.

(10) Patent No.: US 9,538,844 B2
(45) Date of Patent: Jan. 10, 2017

(54) SLIDE ASSEMBLY

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Shih-Lung Huang, Kaohsiung (TW); Ting-Tsai Huang, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 6 days.

(21) Appl. No.: 14/165,804

(22) Filed: Jan. 28, 2014

(65) Prior Publication Data

US 2015/0211574 A1  Jul. 30, 2015

(51) Int. Cl.
  *A47B 88/04* (2006.01)
  *F16C 29/04* (2006.01)
  *F16C 29/00* (2006.01)
  *A47B 88/14* (2006.01)
  *F16B 39/24* (2006.01)

(52) U.S. Cl.
  CPC ............ *A47B 88/0418* (2013.01); *A47B 88/14* (2013.01); *A47B 2210/0032* (2013.01); *A47B 2210/0059* (2013.01); *A47B 2230/0029* (2013.01); *F16B 39/24* (2013.01); *F16C 29/004* (2013.01); *F16C 29/04* (2013.01); *F16C 2314/72* (2013.01)

(58) Field of Classification Search
  CPC ... A47B 88/0418; A47B 88/044; A47B 88/14; A47B 2210/0032; A47B 2210/0059; A47B 2230/0029; Y10T 29/49952; F16B 5/0233; F16B 5/025; F16B 39/24; F16C 29/04; F16C 29/004; F16C 2314/72
  USPC .......................................... 411/544, 536, 546
  See application file for complete search history.

(56) References Cited

U.S. PATENT DOCUMENTS

| | | | | |
|---|---|---|---|---|
| 868,067 | A | * | 10/1907 | Berry ............................... 29/509 |
| 2,923,506 | A | * | 2/1960 | Simons ........................ 248/486 |
| 3,058,795 | A | * | 10/1962 | Siegal et al. .................. 312/194 |
| 3,169,806 | A | * | 2/1965 | Beeck .............................. 384/19 |
| 3,550,681 | A | * | 12/1970 | Scaboo et al. ............... 165/80.3 |
| 4,435,112 | A | * | 3/1984 | Becker .......................... 411/368 |
| 5,209,356 | A | * | 5/1993 | Chaffee ........................... 211/26 |
| 5,249,901 | A | * | 10/1993 | Moore .......................... 411/182 |
| 5,457,867 | A | | 10/1995 | Maberry et al. |
| 5,586,364 | A | * | 12/1996 | Ferrari et al. .................... 16/383 |
| 5,895,101 | A | | 4/1999 | Cabrales et al. |
| 6,394,537 | B1 | * | 5/2002 | DeRees ......................... 296/191 |
| 6,402,276 | B1 | * | 6/2002 | King .......................... 312/334.7 |

(Continued)

*Primary Examiner* — Alan B Waits
(74) *Attorney, Agent, or Firm* — Rosenberg, Klein & Lee

(57) ABSTRACT

A slide assembly includes a first rail, a second rail and at least one positioning device. The first rail has a first elongate body. The second rail is longitudinally slidable relative to the first rail and has a second elongate body. At least one of the first elongate body and the second elongate body has an installation hole. The at least one positioning device has a support member and a fixing member. The support member transversely extends through the installation hole so as to be transversely and movably connected to the at least one of the first elongate body and the second elongate body. The fixing member is fixed to a portion of the support member.

7 Claims, 5 Drawing Sheets

A-A

(56) References Cited

U.S. PATENT DOCUMENTS

| | | | |
|---|---|---|---|
| 6,494,550 B1* | 12/2002 | Chen et al. | 312/334.5 |
| 6,578,939 B1* | 6/2003 | Mayer | 312/334.5 |
| 6,712,435 B2 | 3/2004 | Kim et al. | |
| 7,192,234 B2* | 3/2007 | Anderson et al. | 411/533 |
| 7,717,659 B2* | 5/2010 | Lang | 411/533 |
| 7,744,176 B2 | 6/2010 | Milligan | |
| 7,874,059 B2* | 1/2011 | Morrison et al. | 29/525.02 |
| 8,281,603 B2* | 10/2012 | Johnson | 60/799 |
| 8,832,919 B2* | 9/2014 | Ivinson et al. | 29/505 |
| 2013/0106271 A1 | 5/2013 | Anderson et al. | |

\* cited by examiner

A-A

SLIDE ASSEMBLY

FIELD OF THE INVENTION

The present invention relates to a slide assembly, and more particularly, to a slide assembly capable of quickly installed between a cabinet and a drawer.

BACKGROUND OF THE INVENTION

U.S. Pat. No. 5,457,867 to Maberry et al. discloses a slide assembly and is incorporated herein by reference, which uses rollers 24, 40 as sliding media and comprises a cabinet member 14 and a drawer member 38 slidably connected to the cabinet member 14. When assembling, the cabinet member 14 is fixed to a cabinet panel 12 by a pair of bushings 16, 18 and a pair of screws 20A, 20B, and the drawer member 38 is fixed to a side of a drawer 36 such that the drawer 36 is slidably connected to the cabinet member 14 by the drawer member 38 and easily slides relative to the cabinet panel 12.

The slide assembly using the rollers 24, 40 mentioned above allows a larger assembly tolerance between the drawer 36 and the cabinet panel 12, so that, for the furniture manufacturers, the precision for the drawer 36 and the cabinet panel 12 can be compromised and needs not to be compared with industrial precision. Therefore, the slide assemblies using rollers 24, 40 are widely used on furniture combinations. Nevertheless, the slide assemblies using the rollers 20, 24 have restriction of the loads. Furthermore, as to compensate the assembly tolerance, the slide assemblies are not easily to be combined with soft-closing or push-open design to increase their values.

U.S. Pat. No. 5,895,101 to Cabrales et al. discloses a slide assembly and is incorporated herein by reference, which uses ball bearings as sliding media. The ball bearings have higher standard of precision and can bear relative high load, so that they are welcomed by customers. Furthermore, the ball bearings can be combined with soft-closing design, such as the disclosure of U.S. Pat. No. 6,712,435 B2 to Kim et al. However, the high precision of the ball bearings makes them to be squeezed by the drawer and the cabinet when the assembly tolerance between the drawer and the cabinet is beyond the permissible range of the slide assembly. This will result awkward operation of the drawers.

U.S. Publication No. 2013/0106271 A1 to Anderson et al. discloses a rail assembly having at least one fixed member 56 and at least one floating member 54 and is incorporated herein by reference. The at least one fixed member 56 is transversely fixed to a drawer slide, and the at least one floating member 54 is transversely and slidably connected to the fixed member 56. This arrangement permits a relatively large assembly tolerance between the drawer and the cabinet.

However, once the floating member 54 has a quality flaw such as the floating member is broken or the assembly tolerance between the drawer and the cabinet is too large, the floating member 54 might drop from the fixed member 56, and thus, the position to which the whole set of the rail assembly is installed does not permit to have the relative large tolerance between the drawer and the cabinet.

The present invention intends to provide a slide assembly that has a support member which is able to move a limited distance so as to compensate the displacement because of installation tolerance.

SUMMARY OF THE INVENTION

The present invention relates to a slide assembly, which comprises a first rail, a second rail and at least one positioning device. The first rail has a first elongate body. The second rail is longitudinally slidable relative to the first rail and has a second elongate body, wherein at least one of the first elongate body and the second elongate body has an installation hole. The at least one positioning device has a support member and a fixing member. The support member transversely extends through the installation hole so as to be transversely and movably connected to the at least one of the first elongate body and the second elongate body, and wherein the fixing member is securely connected to a portion of the support member.

Preferably, a ball bearing retainer is disposed between the first and second rails and has a plurality of ball bearings retained thereby so as to facilitate sliding movement of the second rail relative to the first rail.

Preferably, a third rail is slidably connected between the first and second rails. A first ball bearing retainer is disposed between the first and third rails and has a plurality of first ball bearings retained thereby so as to facilitate sliding movement of the third rail relative to the first rail. A second ball bearing retainer is disposed between the second and third rails and has a plurality of second ball bearings retained thereby so as to facilitate sliding movement of the second rail relative to the third rail.

Preferably, the support member has a head portion, a body portion and a neck portion which extends between the head portion and the body portion. The neck portion of the support member is at least partially fitted within the installation hole and has a length larger than a depth of the installation hole such that the support member is transversely movable relative to the at least one of the first elongate body and the second elongate body.

Preferably, a resilient member is disposed between the support member and the at least one of the first elongate body and the second elongate body so as to provide a force to keep the support member at a pre-set position.

Preferably, the slide assembly further comprises a connection frame. The connection frame has a slot and at least one latch. A distal end of the first rail is inserted into the slot of the connection frame.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
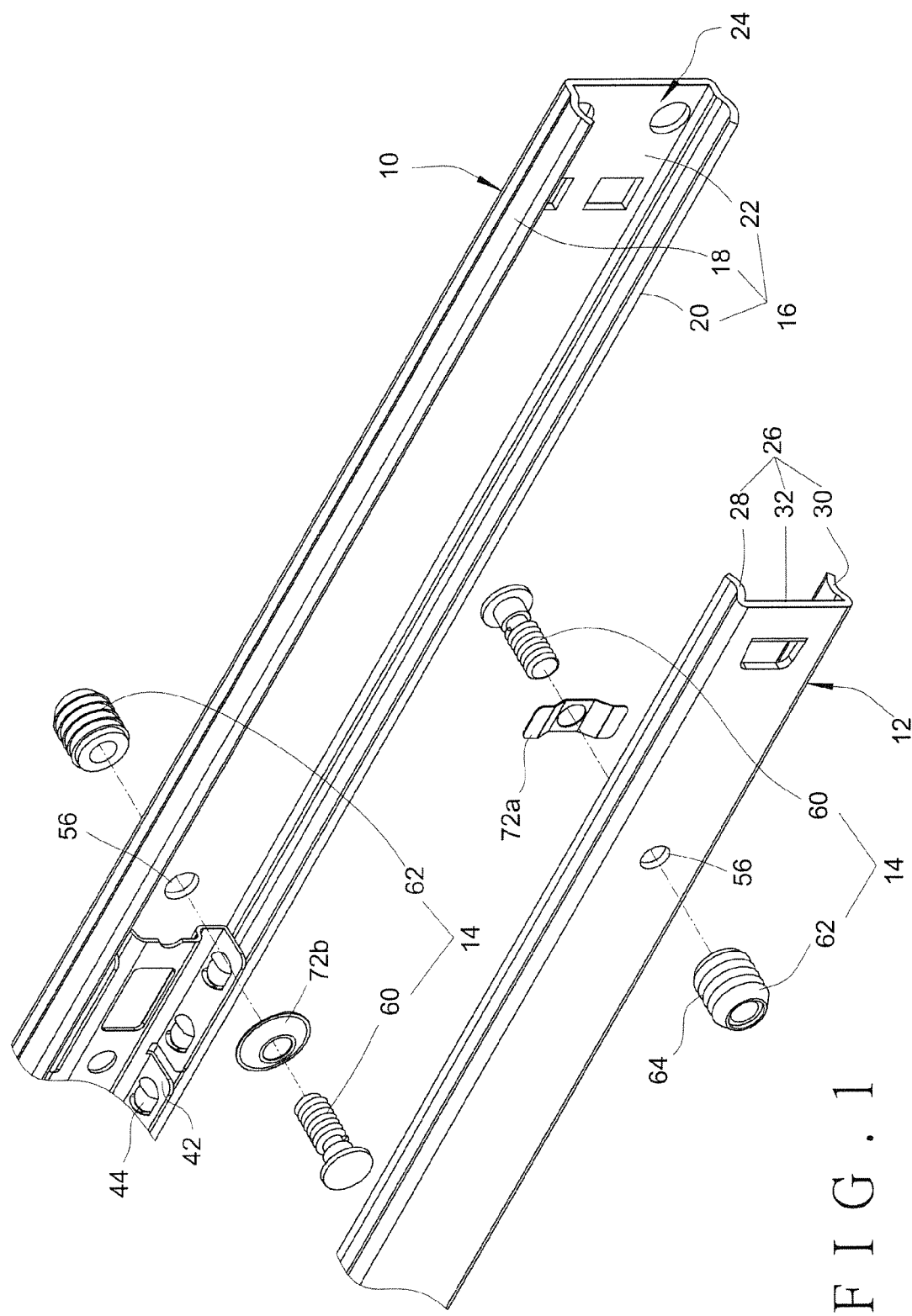
FIG. 1 is an exploded view of a slide assembly in accordance with a preferred embodiment of the present invention.
Figure 2:
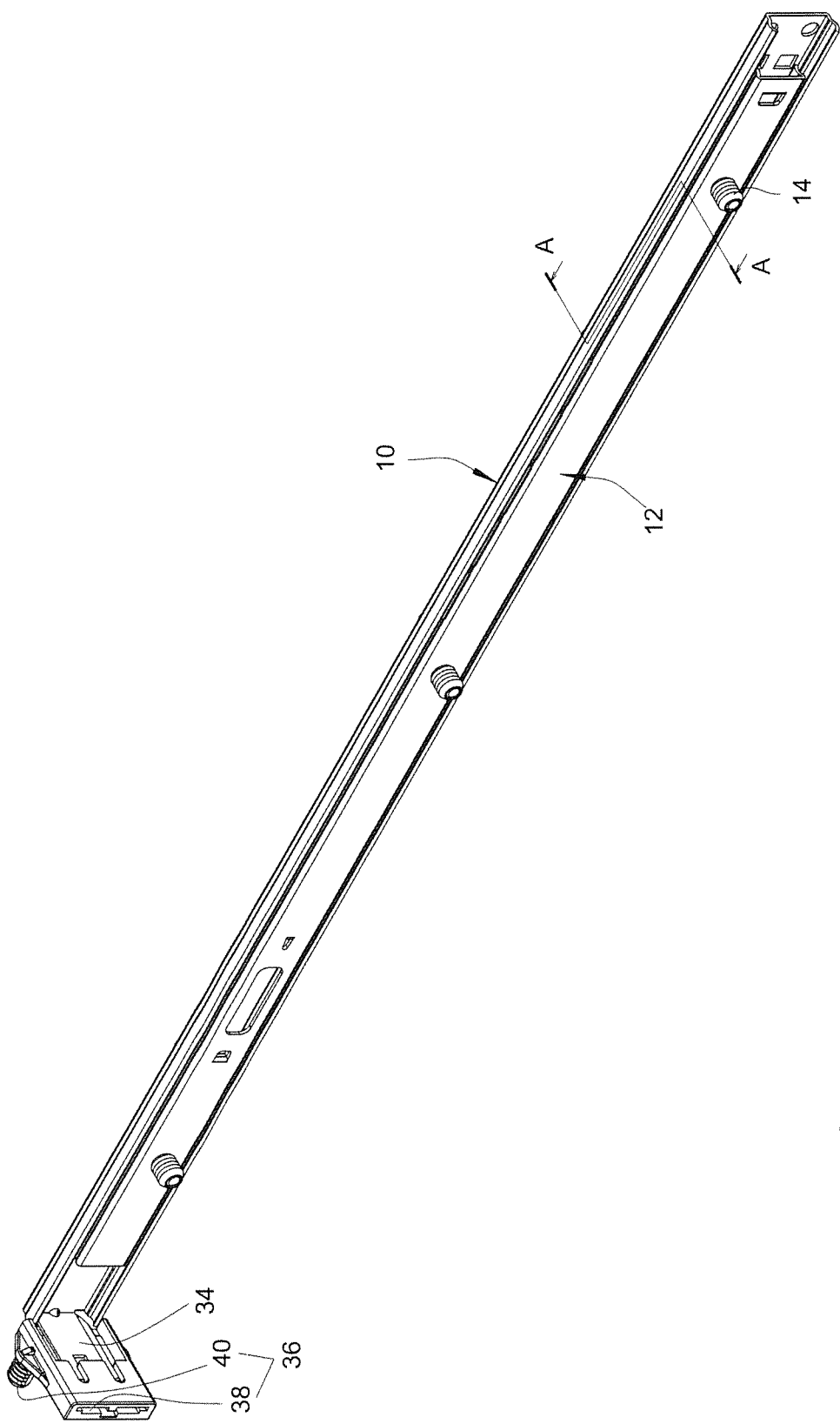
FIG. 2 is a perspective view of the slide assembly in accordance with the preferred embodiment of the present invention.

Referring to FIGS. 1 and 2, the slide assembly of a preferred embodiment of the present invention comprises a first rail 10, a second rail 12, and at least one positioning device 14.

The first rail 10 has a first elongate body 16. The first elongate body 16 has a first wall 18, a second wall 20 opposite to the first wall 18, and a side wall 22. The side wall 22 extends between the first and second walls 18, 20 so that a path 24 is bounded by the first wall 18, the second wall 20 and the side wall 22.

The second rail 12 has a second elongate body 26 which is slidably received in the path 24 of the first rail 10, so that the second rail 12 is longitudinally movable relative to the first rail 10. In detail, the second elongate body 26 has a top wall 28, a bottom wall 30 opposite to the top wall 28, and an intermediate wall 32 extending between the top and bottom walls 28, 30. Preferably, the slide assembly further has a connection frame 36. The connection frame 36 has a slot 38 and at least one latch 40, and a distal end 34 of the first rail 10 is inserted into the slot 38 of the connection frame 36 such that the first rail 10 can be fixed to a cabinet (not shown) by the at least one latch 40 of the connection frame 36.

Figure 3:
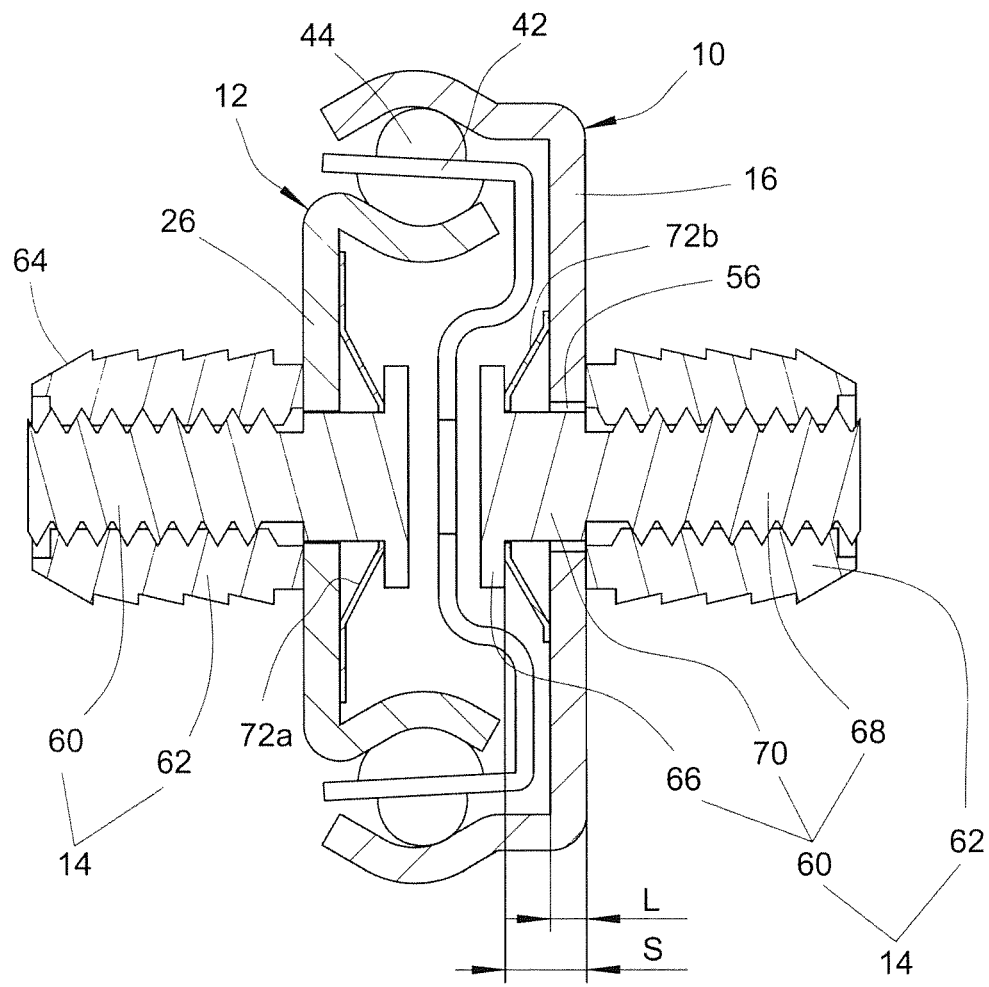
FIG. 3 is a cross sectional view of the slide assembly in accordance with the preferred embodiment of the present invention, taken along a line A-A in FIG. 2.

Preferably, referring to FIG. 3, a ball bearing retainer 42 is disposed between the first and second rails 10, 12 and has a plurality of ball bearings 44 retained thereby so as to facilitate sliding movement of the second rail 12 relative to the first rail 10, thus forming a two-stage ball bearing slide assembly.

Figure 4:
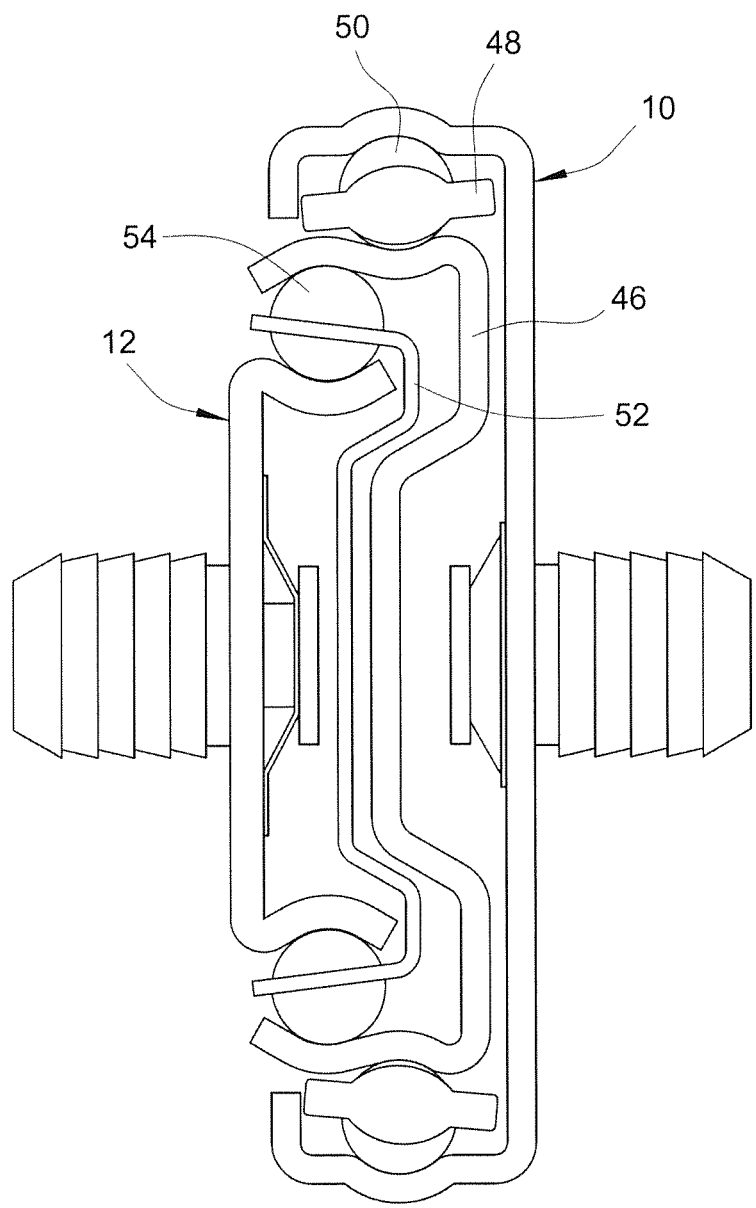
FIG. 4 is a side view of a three-stage slide assembly in accordance with a preferred embodiment of the present invention.

Preferably, as shown in FIG. 4, the slide assembly further comprises a third rail 46, a first ball bearing retainer 48 and a second ball bearing retainer 52. The third rail 46 is slidably connected between the first and second rails 10, 12. The first ball bearing retainer 48 is disposed between the first and third rails 10, 46 and has a plurality of first ball bearings 50 retained thereby so as to facilitate sliding movement of the third rail 46 relative to the first rail 10. The second ball bearing retainer 52 is disposed between the second and third rails 12, 46 and has a plurality of second ball bearings 54 retained thereby so as to facilitate sliding movement of the second rail 12 relative to the third rail 46. Therefore, a three-stage ball bearing slide assembly is formed.

Furthermore, at least one of the side wall 22 of the first elongate body 16 of the first rail 10 and the intermediate wall 32 of the second elongate body 26 of the second rail 12 has at least one installation hole 56 defined therein, and at least one of the side wall 22 of the first elongate body 16 of the first rail 10 and the intermediate wall 32 of the second elongate body 26 of the second rail 12 has at least one positioning device 14 disposed thereon. The at least one positioning device 14 has a support member 60 and a fixing member 62. The support member 60 transversely extends through the installation hole 56 so as to be transversely and movably connected to the at least one of the first elongate body 16 and the second elongate body 26, and the fixing member 62 is securely connected to a portion of the support member 60. In detail, the fixing member 62 has a plurality of hook-shaped annular ribs 64 protruding from an outside thereof, and the fixing member 62 and the support member 60 are connected to each other by way of threading, riveting, or any known method.

Specifically, the support member 60 has a head portion 66, a body portion 68, and a neck portion 70 extending between the head portion 66 and the body portion 68. The neck portion 70 of the support member 60 is at least partially fitted within the installation hole 56 and is movable along a depth direction of the installation hole 56. Furthermore, a length S of the neck portion 70 is larger than a depth L of the installation hole 56 such that the support member 60 is allowed to transversely move relative to the at least one of the first elongate body 16 and the second elongate body 26 within a range restricted to the length S of the neck portion 70. It is noted that the positioning device 14 can be selectively disposed on one of the first and second elongate bodies 16, 26 or on both of the first and second elongate bodies 16, 26. The purpose is that the support member 60 is transversely movable relative to the slide assembly.

Preferably, a resilient member 72a, 72b is disposed between the support member 60 and the at least one of the first elongate body 16 and the second elongate body 26 so as to provide a force to keep the support member 60 at a pre-set position. The resilient member 72a, 72b can be a flat spring, a compression spring or other resilient members which can keep the support member 60 at the pre-set position.

Figure 5:
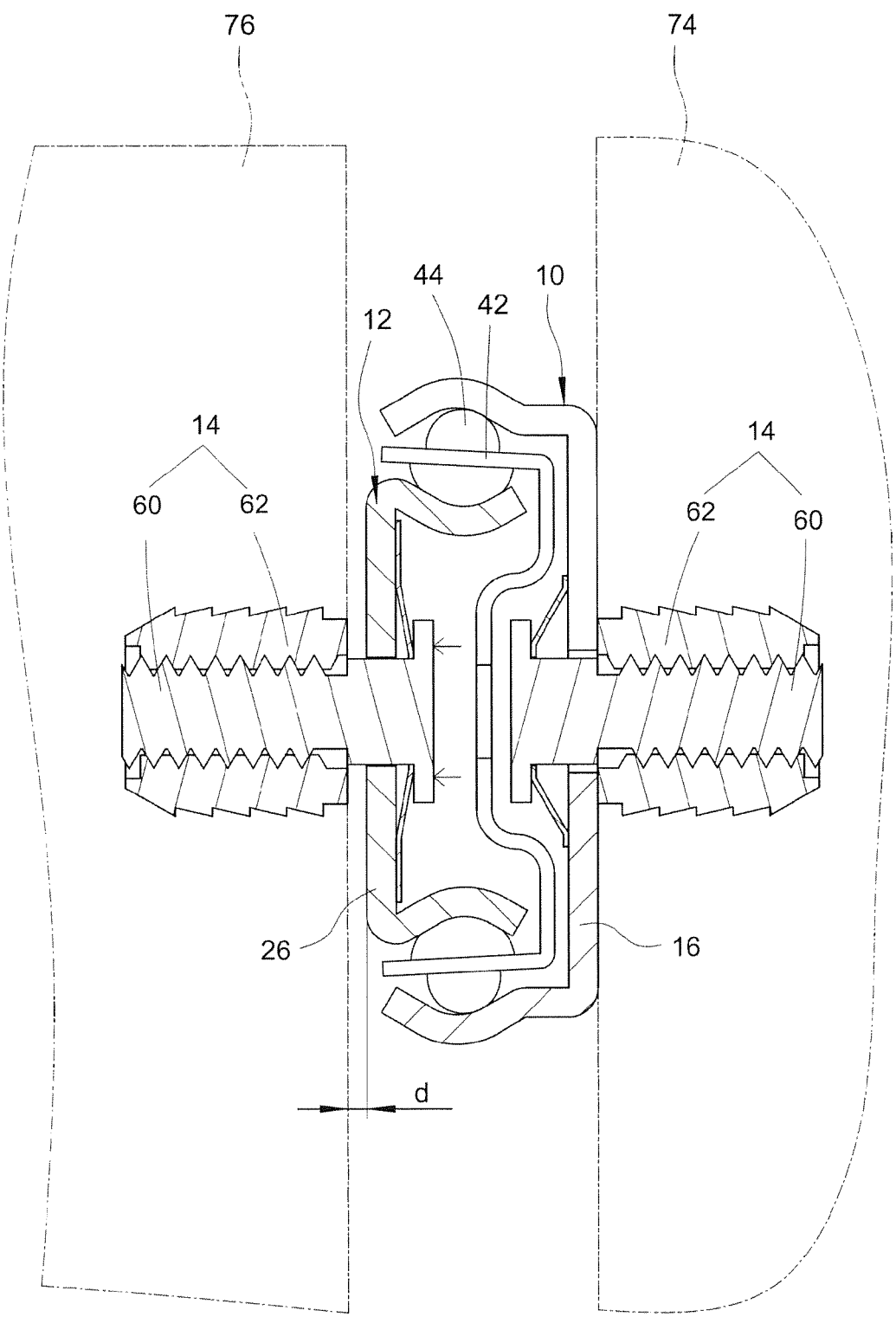
FIG. 5 is a cross section view of a slide assembly in accordance with a preferred embodiment of the present invention, wherein the slide assembly is installed between a cabinet and a drawer.

FIG. 5 further shows an embodiment of the present invention. In this embodiment, the first elongate body 16 of the first rail 10 and the second elongate body 26 of the second rail 12 each have a positioning device 14 disposed thereon. When in use, the fixing member 62 of the positioning device 14 disposed on the first elongate body 16 of the first rail 10 is installed to a cabinet 74, and the fixing member 62 of the positioning device 14 disposed on the second elongate body 26 of the second rail 12 is installed to a drawer 76, such that the slide assembly is installed between the cabinet 74 and the drawer 76. Since the fixing members 62 are securely connected to their respective support members 60 which are allowed to move transversely relative to the first and second elongate bodies 16, 26, when an assembly tolerance d is formed between the cabinet 74 and the drawer 76, the fixing members 62 are able to transversely move together with their respective support members 60 within a range to compensate the assembly tolerance d.

Preferably, the fixing member 62 and the support member 60 are securely connected to form an integral member, which has better structural strength, so as to avoid the fixing member 62 from deformation, broken and dropping from the support member 60 because of quality flaw or over-load. Therefore, the slide assembly in accordance with the preferred embodiment of the present invention compensates the assembly tolerance d and thus facilitate rolling movement of the ball bearings 44 retained by the ball bearing retainer 42.

While we have shown and described the embodiment in accordance with the present invention, it should be clear to those skilled in the art that further embodiments may be made without departing from the scope of the present invention.

What is claimed is:

1. A slide assembly comprising:
    a rail defining a longitudinal direction and having an elongate body, the elongate body having an installation hole, wherein the rail is displaceable in the longitudinal direction; and
    at least one positioning device having a support member and a fixing member, the support member having a head portion, a body portion, and a neck portion extending therebetween, the neck portion being different in surface contour from the body portion, the neck portion fitted through the installation hole and extending beyond the installation hole in a transverse direction, wherein the fixing member is releasably coupled to the body portion of the support member, and the support member and the fixing member being biased between the rail by a resilient member interfacing between the rail and the neck portion, whereby the support member and the fixing member are transversely displaceable relative to the rail;

wherein the neck portion of the support member has a length larger than a depth of the installation hole.

2. The slide assembly as claimed in claim 1, wherein the resilient member is annularly contoured to provide a force to keep the support member at a pre-set position relative to the elongate body.

3. A slide assembly comprising:

a first rail having a first elongate body;

a second rail being longitudinally slidable in a longitudinal direction relative to the first rail and having a second elongate body, wherein at least one of the first elongate body and the second elongate body has an installation hole; and at least one positioning device having a support member and a fixing member, the support member having a head portion, a body portion, and a neck portion extending therebetween, the neck portion being different in surface contour from the body portion, the neck portion engaging and fitted through the installation hole and extending beyond the installation hole in a transverse direction, wherein the fixing member is releasably coupled to the body portion of the support member, and the support member and the fixing member being biased between either one of the first and second rails by a resilient member interfacing between the first rail or the second rail and the neck portion, whereby the support member and the fixing member are transversely displaceable relative to the first and second rails;

wherein the neck portion of the support member has a length larger than a depth of the installation hole.

4. The slide assembly as claimed in claim 3, further comprising a ball bearing retainer disposed between the first and second rails, wherein the ball bearing retainer has a plurality of ball bearings retained thereby so as to facilitate sliding movement of the second rail relative to the first rail.

5. The slide assembly as claimed in claim 3, further comprising a third rail, a first ball bearing retainer and a second ball bearing retainer, wherein the third rail is slidably connected between the first and second rails; the first ball bearing retainer is disposed between the first and third rails and has a plurality of first ball bearings retained thereby so as to facilitate sliding movement of the third rail relative to the first rail; and the second ball bearing retainer is disposed between the second and third rails and has a plurality of second ball bearings retained thereby so as to facilitate sliding movement of the second rail relative to the third rail.

6. The slide assembly as claimed in claim 3, wherein the resilient member is annularly contoured to provide a force to keep the head portion of the support member at or beyond a pre-set distance from the at least one of the first elongate body and the second elongate body.

7. The slide assembly as claimed in claim 3, further comprising a connection frame, wherein the connection frame has a slot and at least one latch, and a distal end of the first rail is inserted into the slot of the connection frame.

* * * * *